Feb. 24, 1959 S. E. VICK 2,874,598
JIG FOR POSITIONING SCREW HOLES FOR THE WEDGE RECEIVER
OF A FRICTION CATCH FOR DOORS
Filed April 25, 1957
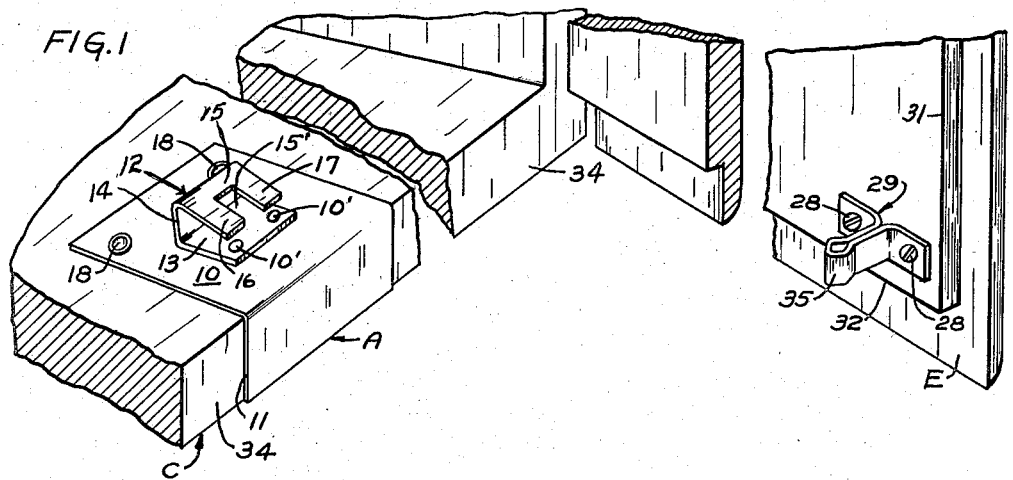
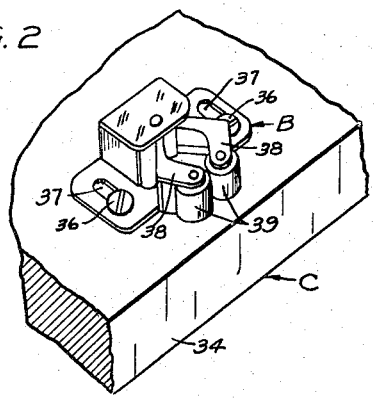
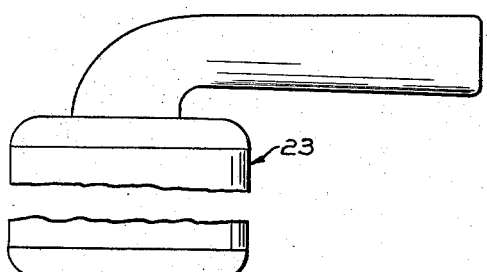
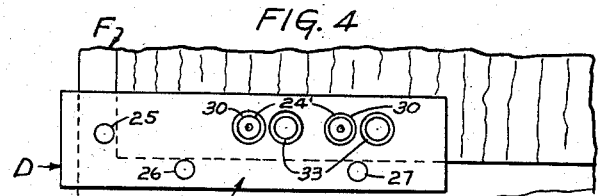
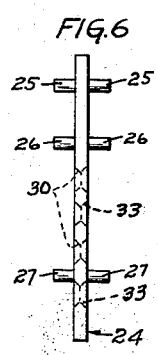
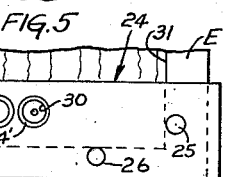
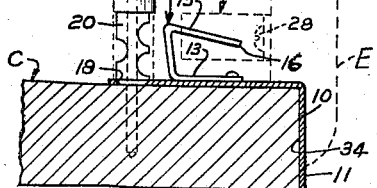
INVENTOR.
SELMER E. VICK
BY
*Jack H. Vick*
ATTORNEY

United States Patent Office 2,874,598
Patented Feb. 24, 1959

2,874,598

JIG FOR POSITIONING SCREW HOLES FOR THE WEDGE RECEIVER OF A FRICTION CATCH FOR DOORS

Selmer E. Vick, Lakeville, Minn.

Application April 25, 1957, Serial No. 655,074

4 Claims. (Cl. 77—62)

My invention relates broadly to an improvement in means for positioning a wedge receiver of a friction catch for doors and more particularly to a jig for positioning screw holes for the screws which secure the wedge receiver of a friction catch for doors particularly of the cabinet type.

It is an object of my invention to provide a jig which allows easy and quick location of the proper point for the screws for securing the wedge receiver of a friction catch whereby the wedge is properly received for secured closing of the door on which the wedge is mounted.

It is also an object to provide a jig having means for locating the wedge receiver of a friction catch with the door in closed position which allows positive and accurate positioning of the wedge receiver.

It is a further object to provide a jig for locating the proper point for the screw holes for securing a wedge receiver of a friction catch and which allows easy accurate drilling of the holes.

It is a still further object to provide a jig for positioning the wedge of a friction catch on the door for proper engagement with the wedge receiver positioned on the jamb of the door opening.

I shall not here attempt to set forth and indicate all of the various objects and advantages incident to my invention, but other objects and advantages will be referred to in or else will become apparent from that which follows.

The invention will appear more clearly from the following detailed description when taken in connection with the accompanying drawings, showing by way of example a preferred embodiment of the inventive idea.

In the drawings forming part of this application:

Figure 1 is a perspective view of a portion of a jamb and the wedge secured to the door.

Figure 2 is a perspective view of the wedge receiver in position on the jamb.

Figure 3 is a section through the jamb and jig positioned thereon with a hand drill and self centering drill bit in position on the jig.

Figure 4 is a top plan view of a jig for positioning the screw holes for the wedge on one corner of a door.

Figure 5 is a top plan view of the jig of Figure 4 in reversed position on a door to locate the screw holes of the wedge on the opposite corner of the door.

Figure 6 is a longitudinal edge view of the jig shown in Figure 4.

Referring to the drawings in detail, my jig A includes the flat base portion 10 which has formed on the front edge thereof the depending right angularly formed lip portion 11. Secured to the top surface of the base portion 10 by means of the rivets 10' is the U-shaped receiver 12 which is formed of the horizontal bottom portion 13, the upstanding vertical portion 14 connected thereto and the upper arm portion 15 which overlies the horizontal bottom portion 13. The upper arm 15 has formed therein the somewhat elongated recess 15' defined by the spaced arms 16 and 17.

The numeral 18 designates a pair of spaced holes which indicate the position of the screw holes for the screws 19 which secure the wedge receiver B to the casing C in the proper position. The holes 18 are countersunk or chamfered so as to receive the bevelled end 20 of the drill centering bit 21 which is mounted in the chuck 22 of the electric hand drill 23.

I further provide the reversible jig portion D which consists of the elongated flat plate portion 24. Secured to the plate 24 and extending from both surfaces thereof are the pins 25, 26, and 27. The reversible jig D is used to locate easily and quickly the holes for the screws 28 that secure the wedge 29 to the inside flat surface of the door E for example. The plate 24 is formed with the mated pair of holes 30 which are bevelled on both faces of the plate 24 as at 24' and are spaced a distance equal to the distance between the screws 28 which secure the wedge 29 to the door E. Further, the holes 30 are spaced from the pin 25 and the pins 26 and 27 the necessary distance so as to locate the holes for the screws 28 to thereby position the wedge 29 in the desired position on the door E.

The wedge 29 is positioned and secured in the proper position on the door E by placing the plate 24 at the lower corner as in Figure 5 with the outer end pin 25 up against the shoulder 31 of the door E and at the same time the pins 26 and 27 against the edge 32 thereof. In this position the end 20 of the bit 21 may be placed in the bevel 24' and holes drilled in the exact proper position for receiving the screws 28 to secure the wedge 29 on the door E. Where holes are needed on the opposite corner of a door, such as F in Figure 4, the plate 24 is reversed and the holes drilled from the opposite side in the same manner as outlined above. The mated holes 33 are identical to 30 but are spaced at a different distance from the pin 25 and the pins 26 and 27 and may be used depending upon the position desired for the wedge 29 on the door E or F.

With the wedge 29 secured to the door E in the correct position, the wedge receiver B may then be positioned on the casing C as follows: The jig A is so placed on the casing C that the flat base portion 10 rests on the top surface of the casing with the lip 11 up against the outer edge 34 of the casing. The jig A is placed on the casing C approximately in line with the wedge 29 when the door E is in closed position. The door E is then closed upon the jig A, as indicated in Figure 3, with the catch portion 35 of the wedge 29 entering the recess 15' of the jig A thereby aligning the movable jig. The jig A is held in place by the operator holding a finger against the lower edge of the lip 11 and the door is then opened clear of the casing. With the jig A held in position the end 20 of the bit 21 is placed in the bevelled holes 18 and the proper depth of holes drilled. The jig A is removed and the wedge receiver B is then secured to the casing C by inserting the screws 36 through the elongated slots 37 and into the holes drilled. Minor adjustments of the wedge position of the receiver B may be made by reason of the slots 37.

The wedge receiver B includes the spring urged pivotally mounted arms 38 having the rollers 39 mounted on the outer ends thereof which receive the end 35 of the wedge 29.

The invention is not to be understood as restricted to the details set forth since these may be modified within the scope of the appended claims without departing from the spirit and scope of the invention.

Having thus described the invention, that which I claim as new and desire to secure by Letters Patent is:

1. In a jig for locating the screw holes for positioning the wedge receiver of a friction door catch on a door casing, a base having a depending lip formed thereon at right angles thereto, a receiver connected to said base and having a recess formed therein adapted to receive the wedge of a friction catch, said base having holes therethrough which indicate the location of the holes for screws used to secure the wedge receiver on a door casing.

2. In a jig for determining screw placement for the wedge receiver of a friction door catch on a door casing, a base having lip means depending therefrom and holes for designating screw placement, and means connected to said base for receiving the wedge of a friction catch secured to a door mounted on the casing for alignment of said base.

3. In a jig for determining screw placement for the wedge receiver of a friction door catch on a door casing, a base having means extending therefrom adapted to engage the edge of the casing, means formed on said base for indicating screw placement for securing the wedge receiver, and means connected to said base for receiving the wedge of a friction catch secured to a door mounted on the casing for alignment of said base.

4. In a jig, support means, means extending from said support means adapted to engage the edge of a door casing, means connected to said support means for receiving the wedge of a friction catch secured to a door mounted on the casing for alignment of said support means on the casing, and means formed on said support means for indicating screw placement for securing the wedge receiver of a friction door catch.

References Cited in the file of this patent

UNITED STATES PATENTS

| | | |
|---|---|---|
| 1,540,991 | Holmgren | June 9, 1925 |
| 1,612,455 | McGeorge | Dec. 28, 1926 |
| 2,348,116 | Dzus | May 2, 1944 |
| 2,528,775 | Ogden | Nov. 7, 1950 |